(12) United States Patent
Schier

(10) Patent No.: US 7,072,363 B1
(45) Date of Patent: Jul. 4, 2006

(54) METHOD AND DEVICE FOR SECURELY COMMUNICATING INFORMATION VIA A DSL NETWORK

(75) Inventor: John E Schier, Austin, TX (US)

(73) Assignee: Cisco Technology, Inc., San Jose, CA (US)

(*) Notice: Subject to any disclaimer, the term of this patent is extended or adjusted under 35 U.S.C. 154(b) by 916 days.

(21) Appl. No.: 09/752,073

(22) Filed: Dec. 29, 2000

(51) Int. Cl.
*H04J 3/06* (2006.01)

(52) U.S. Cl. ............... 370/509; 370/535; 713/200

(58) Field of Classification Search ........ 370/493–495, 370/419; 379/88.13, 201.01, 201.02–201.05; 375/222, 88.13, 201.01, 201.02, 201.05; 713/200–202
See application file for complete search history.

(56) References Cited

U.S. PATENT DOCUMENTS

| | | | |
|---|---|---|---|
| 4,797,672 A | 1/1989 | Kousa ................. 340/825.3 |
| 5,319,712 A | 6/1994 | Finkelstein et al. ........ 380/25 |
| 5,319,776 A | 6/1994 | Hile et al. .................. 713/200 |
| 5,442,708 A | 8/1995 | Adams, Jr. et al. ........... 380/49 |
| 5,784,566 A * | 7/1998 | Viavant et al. ............. 709/229 |
| 5,790,548 A | 8/1998 | Sistanizadeh et al. ....... 370/401 |
| 5,825,891 A | 10/1998 | Levesque et al. ........... 713/153 |
| 5,898,784 A | 4/1999 | Kirby et al. ................ 713/153 |
| 6,181,715 B1 * | 1/2001 | Phillips et al. ............. 370/493 |
| 6,452,942 B1 * | 9/2002 | Lemieux ..................... 370/468 |
| 6,580,727 B1 * | 6/2003 | Yim et al. .................. 370/463 |
| 6,631,120 B1 * | 10/2003 | Milbrandt ................... 370/252 |
| 6,640,239 B1 * | 10/2003 | Gidwani ..................... 709/203 |
| 6,643,701 B1 * | 11/2003 | Aziz et al. ................. 709/227 |
| 6,671,810 B1 * | 12/2003 | Jardin ....................... 713/201 |

\* cited by examiner

*Primary Examiner*—Chau Nguyen
*Assistant Examiner*—Tri H. Phan
(74) *Attorney, Agent, or Firm*—Baker Botts L.L.P.

(57) ABSTRACT

The present invention includes a system, method, and device for securely communicating information Via a DSL Network. In one form, a device operable to provide secure communication of information via the network includes a communication module operable to communicate with a network multiplexer and a security module coupled to the communication module. The security module provides secure communication of information between the communication module and the network multiplexer.

23 Claims, 2 Drawing Sheets

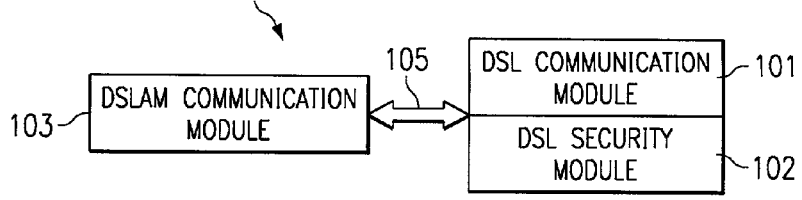
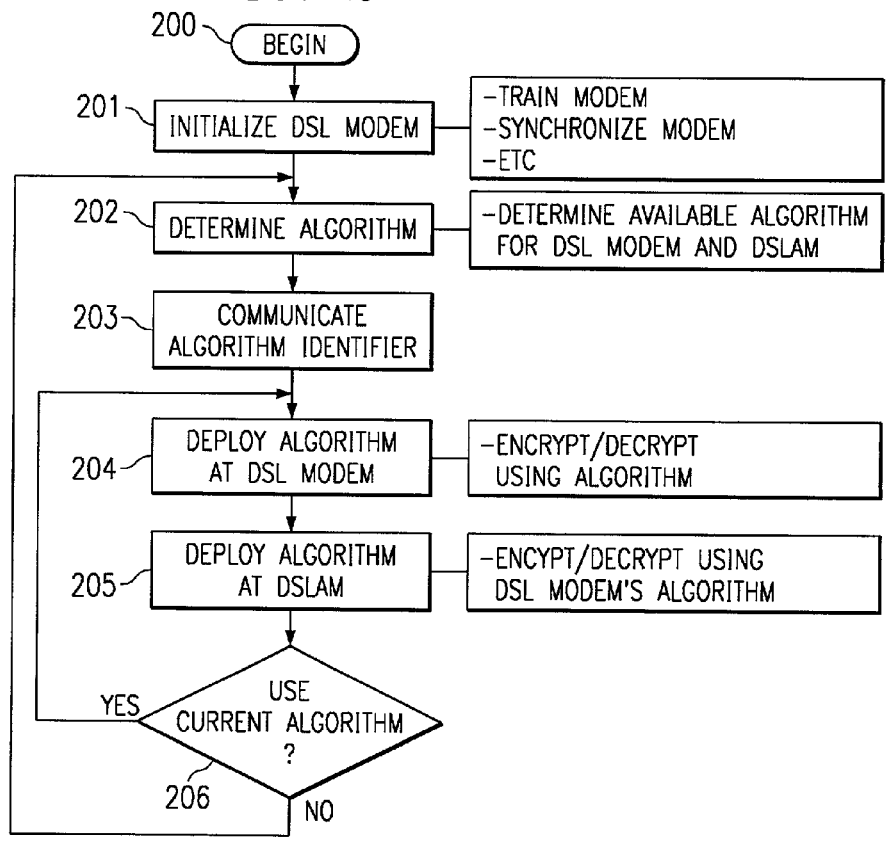
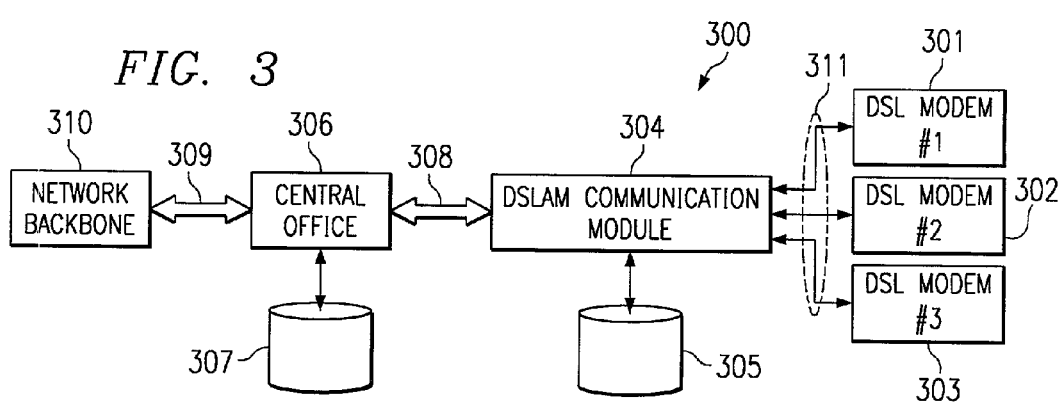

US 7,072,363 B1

METHOD AND DEVICE FOR SECURELY COMMUNICATING INFORMATION VIA A DSL NETWORK

TECHNICAL FIELD

The present invention generally relates to network communications, and more particularly to a method and device for securely communicating information via a DSL network.

BACKGROUND OF THE INVENTION

Secure environments for communicating information is an ongoing concern in the field of communications. Historically, government agencies have used many different types of data encryption to prevent interception of information communicated between parties. Commercially, several techniques have been deployed to reduce or eliminate communications from being intercepted. For example, some conventional wireless telephone systems deploy spread spectrum as a form of wireless communication in which the frequency of the transmitted signal is deliberately varied resulting in greater bandwidth than the signal would have if its frequency were not varied.

For example, a conventional wireless signal often has a frequency, usually specified in megahertz (MHz) or gigahertz (GHz), that does not change with time (except for small, rapid fluctuations that occur as a result of modulation). The signal will stay at approximately 103.1 MHz and may vary up to 105.1 MHz or down to 99.1 MHz. Some conventional wireless telephones maintain the signal constant so the bandwidth can be kept within certain limits and the signal can be easily located by someone who wants to retrieve the information.

SUMMARY OF THE INVENTION

In accordance with the teachings of the present invention, a method and device for securely communicating information via a Digital Subscriber Line (DSL) network are provided. According to one aspect of the invention, a method for securely communicating via a network is disclosed. The method includes identifying an algorithm operable to provide a secure communication between a network multiplexer and a communication module. The method further includes processing information communicated between the communication module and the multiplexer using the algorithm.

According to another aspect of the invention, a device operable to provide secure communication of information via a network is disclosed. The device includes a communication module operable to be communicate with a network multiplexer and a security module coupled to the communication module. The security module is operable to provide secure communication of information between the communication module and the network multiplexer.

According to another aspect of the invention, a device operable to provide secure communication of information via a network is disclosed. The device includes means for identifying an algorithm operable to provide secure communication between a network multiplexer and a communication module. The device further includes means for processing information communicated between the communication module and the multiplexer using the algorithm.

According to another aspect of the invention, a medium including encoded logic for providing secure communication of information is disclosed. The logic operable identify an algorithm operable to provide a secure communication between a network multiplexer and a communication module. The logic may further be operable to process information communicated between the communication module and the multiplexer using the algorithm.

Technical advantages of certain embodiments of the invention include securely communicating information via a Digital Subscriber Line (DSL) enabled network. In one embodiment, a DSL modem may be operably coupled to a Digital Subscriber Line Access Multiplexer (DSLAM) to multiplex and demultiplex signals communicated via a DSL network. One or more DSL modems coupled to the DSLAM may employ algorithms for encrypting and/or decrypting information communicated between the DSL modem and the DSLAM. The DSLAM may be coupled to plural DSL modems to encrypt and/or decrypt information as required using each DSL modem's specified algorithm.

Another technical advantage of certain embodiments of the invention include providing a DSL network with one or more databases to establish a secure communication environment for DSLAMs having associated DSL modems. Each database may be accessible by a central office and/or DSLAM and may include DSL modem specific information for each DSL modem associated with the DSLAM. Each database may also include information for identifying algorithms operable to be used by each DSL modem and DSLAM. The database may be periodically updated to include new subscribers, DSL modem types, DSL model identifiers, DSL modem specific algorithms, or other information associated with DSL modems and DSLAMs. In this manner, information for specific DSL modems and DSLAMs may be maintained, accessed, updated, etc. to include reference information for providing secure communication of information via a DSL network.

Other technical advantages are readily apparent to one skilled in the art from the attached figures, description, and claims.

BRIEF DESCRIPTION OF THE DRAWINGS

FIG. 1 illustrates one embodiment of a communication device operable to securely communicate information via an xDSL network;

FIG. 2 illustrates one embodiment of a flow diagram of a method for securely communicating information using an xDSL modem operable to communicate via an xDSL network;

FIG. 3 illustrates one embodiment of an xDSL network employing communication devices for securely communicating information.

DETAILED DESCRIPTION OF THE INVENTION

Figure 4:
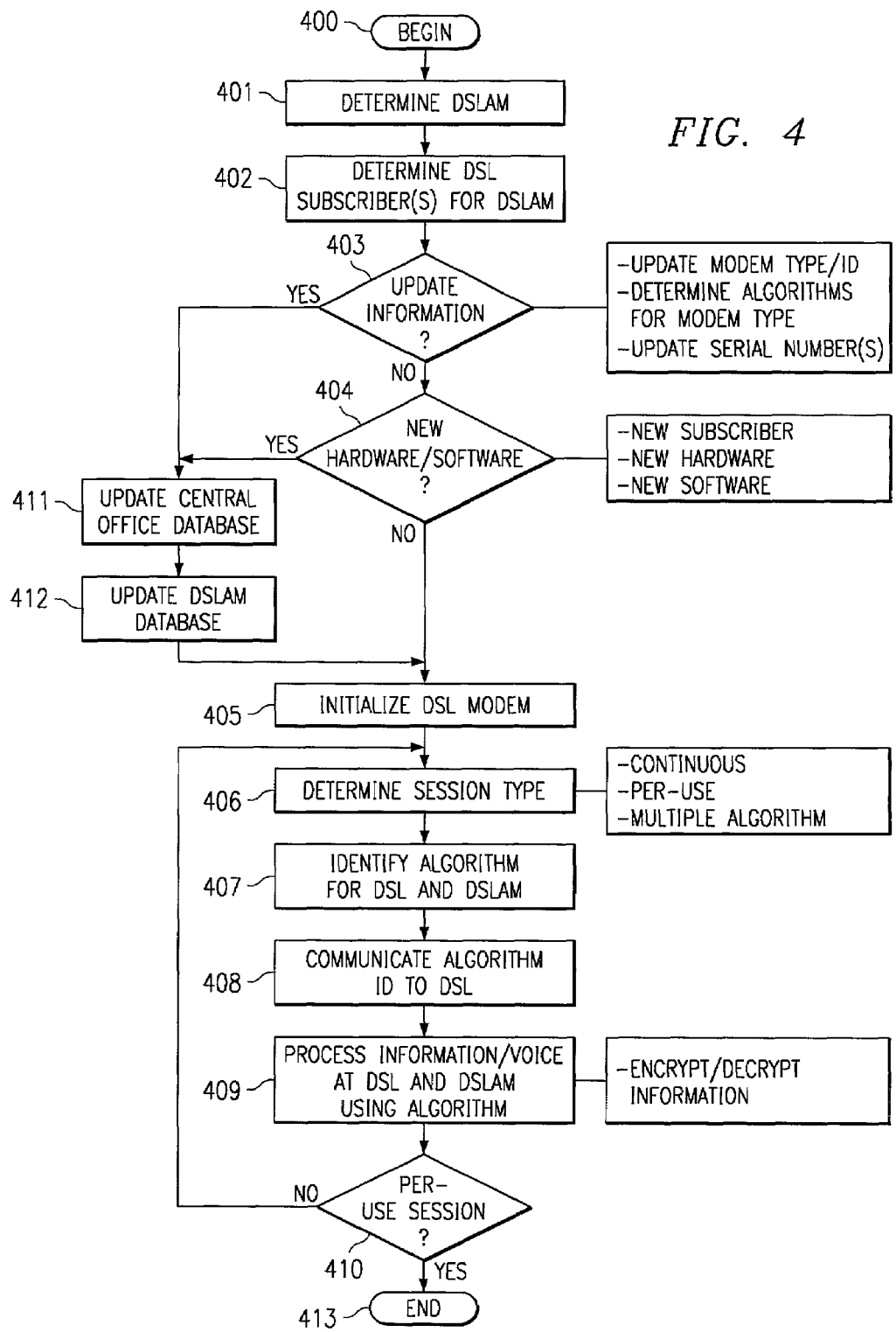
FIG. 4 illustrates one embodiment of a flow diagram of a method for securely communicating information between a DSL modem and a DSLAM multiplexer.

FIG. 1 illustrates a communication device operable to securely communicate information via an xDSL network. xDSL may include several different variations of DSL communication which may include, but is not limited to, Asymmetric Digital Subscriber Line (ADSL), High bit-rate Digital Subscriber Line (HDSL), Symmetric Digital Subscriber Line (SDSL), Rate-Adaptive Digital Subscriber Line (RADSL), or other forms and/or configurations for providing digital subscriber line networks operable to provide high-bandwidth communication of information. As such, xDSL, DSL, HDSL, ADSL, etc. references used throughout the detailed description generally refer to digital subscriber line enabled communication. An xDSL network may be used to carry both data and voice signals and allows digital signals to be communicated without requiring the signals to be changed from an analog signal to a digital signal. As such, digital information may be transmitted to a computer system directly as a digital signal allowing the DSL network to use a wider bandwidth for transmitting information.

xDSL network 100 includes a DSL communication module 101, a DSL security module 102 and DSLAM communication module 103. DSL security module 102 may be operably coupled using DSL communication module 101 to provide secure communication between DSLAM communication module 103 and DSL communication module 101. Though illustrated as separate components, DSL communication module 101 and DSL Security module 102 may be configured as a single device operable to securely communicate information.

During use, DSLAM 103 connects one or more DSL communication modules to a high-speed backbone network (not expressly shown). DSLAM 103 may use an asynchronous transfer mode network operable to aggregate transmission of information at gigabit data rates. In one embodiment DSLAM 103 may be located proximal to a central office and receive signals from multiple DSL communication modules and communicate associated signals to a high speed network backbone using multiplexing techniques. DSLAM 103 may connect DSL communication module 101 with a combination of data transfer modes such as asynchronous transfer mode, frame relay, Internet Protocol, etc.

In one embodiment, DSL security module 102 and DSLAM 103 may include encryption electronics operable to encrypt digital information and/or analog signals communicated between DSLAM 103 and DSL communication module 101. Encryption electronics may be used to encrypt and decrypt information communicated between each module and may be activated based on a request initiated by a user, such as on a per-session basis, or on a continuous basis.

For example, upon DSL communication module 101 training or synchronizing with DSLAM 103, DSLAM 103 may communicate an instruction to communication module 101 to use one or more encryption algorithms operably associated with DSLAM 103 and DSL security module 102. For example, DSL security module 102 may employ several different types of algorithms that may be used with DSLAM 103. As such, an algorithm common to both may be randomly selected for providing secure communication of voice and/or data communicated via DSL communication medium 105 which may include a twisted pair conductors operable to communicate signals. In another embodiment, DSL security module 102 and DSLAM 103 may periodically change the encryption algorithms used during a session thereby allowing for multiple encryption's within a single session for increased security. By providing a DSLAM operable to identify one or more algorithms which may be deployed by the DSLAM and an associated DSL communication module, secure communication of information between a DSLAM and a DSL communication module may be provided.

FIG. 2 illustrates a flow diagram of a method for securely communicating information using an xDSL modem operable to communicate via an xDSL network. The method begins at step 200. At step 201, a communication module such as a DSL modem is initialized (i.e. trained, synchronized, etc.) with a line card that may be resident in a host such as a DSLAM. At step 202, the method determines an algorithm operable to be used by the DSL modem and the DSLAM. For example, a DSL modem may include several factory installed algorithms and the method may determine an algorithm associated with the DSL modem that may be used by both the DSL modem and the DSLAM. Upon determining an algorithm that may be used by the DSLAM and the DSL modem, the DSLAM communicates an instruction to the DSL modem identifying which algorithm to use for encrypting/decrypting information. For example, a reference identifying the algorithm may be included within a header of one or more packets of data communicated between the DSLAM and the DSL. As such, the DSL modem locates the reference within the header and uses the algorithm identified within the header.

Upon identifying the algorithm, the method proceeds to step 204 where the method deploys the algorithm at the DSL modem and DSLAM. For example, the DSLAM may identify a 16-bit encryption algorithm operable to be used by the DSL modem. As such, the 16-bit algorithm may encrypt information and/or voice signals communicated from the DSL modem to the DSLAM. Upon receiving the encrypted information, the DSLAM may decrypt the information/voice signal using the same 16-bit encryption algorithm. In this manner, algorithms for specific DSL modems may be used to securely communicate information using a DSL network.

Upon communicating the information, the method proceeds to step 206 where the method determines if the current algorithm should be continually used to encrypt and/or decrypt information and/or voice signals. For example, several different algorithms may be used by the DSL modem to encrypt and decrypt information and the method may use various encryption algorithms to provide additional security for communicating information and/or voice signals via the DSL enabled network. If the method determines that a new algorithm will be used, the method proceeds to step 202 where the method determines a new algorithm. If at step 206 a new algorithm is not needed, the method proceeds to step 204 where information is encrypted/decrypted between the DSL modem and the DSLAM using the previously identified algorithm.

FIG. 3 illustrates an xDSL network employing communication devices for securely communicating information. The xDSL network, illustrated generally at 300, includes a first DSL modem 301, a second DSL modem 302, and a third DSL modem 303. DSLAM communication module 304 is operable to provide multiplexed and demultiplexed signals communicated between DSL modems 301, 302 and 303 and a Central Office (CO) 306. DSLAM 304 may be integrated as part of CO 306 or may be integrated with a in-line card located distal from CO 306. For example, DSLAM 304 may include one or more line cards operable to interface with DSL modems 301, 302, and 303 using twisted pair. DSLAM 304 may then multiplex the signals for communication over a high speed network. Central office 306 is coupled to one or more DSLAMs and operable to communicate with a network backbone 310 such as a high-speed communication network operable to communicate information at gigabyte data transfer rates.

Central Office 306 includes a central office database 307 for maintaining information for each DSL, shown collectively at 311, coupled to one or more DSL modems. In one embodiment, CO database 307 may include subscriber information for first DSL modem 301, second DSL Modem 302, and third DSL modem 303. Associated information for each DSL may include the respective DSL modem type, activation status, subscriber information, serial and model number for each DSL modem, types of algorithms available for each DSL modem, an associated DSLAM identifier, etc.

DSLAM 304 may also include a DSLAM database 305 that includes information for each DSL and DSL module connected to DSLAM 304. Several DSLAMs may be operably coupled to CO 306 with each DSLAM including a database for each DSL modem coupled thereto. In a similar manner to CO database 307, each DSLAM database 305 may include information for each specific DSL modem operably associated therewith. For example, DSLAM database 305 may include DSL modem type, activation status, subscriber information, serial and model number for each DSL modem, types of algorithms available for each DSL modem and other specific information for each DSL modem. Though illustrated as separate databases, CO database 307 and DSLAM database 305 may be a single database accessible by CO 306 and DSLAM 304. For example, a DSLAM database subset for each DSLAM operably associated with CO 306 may be included within CO database 307.

CO 306 may update DSLAM database 305 using CO database 307 for new subscribers or discontinued service for DSL modems coupled to DSLAM 304. In one embodiment, CO database 307 and DSLAM database 305 may be updated based on upgrades to xDSL network 300 such as adding new subscribers, upgrading/replacing hardware, updating software, etc. Additionally, DSLAM database 305 and CO database 307 may be synchronized on a periodic basis to include changes to subscribers and/or hardware associated with xDSL network 300. For example, a DSLAM may be operable to use an algorithm for a newly installed DSL modem. As such, CO database 307 may be updated to enable the new algorithm for DSLAM module 304.

In one embodiment, new algorithms for securely communicating information may be communicated to DSLAM 304 and/or the DSL modems. For example, an algorithm may be communicated to a DSL modem operable to receive a new algorithm and stored within memory associated with the DSL modem. Similarly, DSLAM database 305 may be operable to store a new algorithm. As such, DSLAM 304 may identify the new algorithm for the DSL modem and select the new algorithm to encrypt and/or decrypt information and/or voice signals communicated between DSLAM 304 and an appropriate DSL modem employing the algorithm. In this manner, a DSL modem and/or DSLAM may be programmed and/or reprogrammed with various algorithms to provide a secure communication environment.

DSLAM database 305 may be used to identify algorithms which may be employed by DSLAM 304 and a selected DSL modem. For example, DSL modem 301 may be operable to use a particular algorithm for securely communicating information and DSLAM may be operable to use the same algorithm to encrypt/decrypt information. As such, DSLAM database 305 may be used to select algorithm(s) for use by both DSLAM module 304 and DSL modem 301 and communicate an instruction to DSL modem 301 identifying the algorithm(s). In a similar manner, DSLAM 304 may identify a different algorithm operable to be used by DSL modem 302. As such, DSLAM 304 may communicate an instruction to DSL modem 302 to use the second algorithm. As such, DSLAM 304 may encrypt and/or decrypt information communicated between DSLAM 304 and DSL modems using modem specific algorithms identified for securely communicating information and/or voice signals via DSL network 300.

In another embodiment, a secure communication environment may be provided on a periodic basis such as a per-use basis or subscription basis. For example, a user may desire a continuous secure communication environment. As such, DSLAM database 305 and/or CO database 307 may be updated to enable the continuous secure communication between a specified DSLAM and an associated DSL modem.

In another embodiment, a user may want to enable a secure communication environment on a per-use basis for a specific session. For example, a user may depress a select group of characters on a key pad (not expressly shown) associated with initiating secure communication, select a function button associated with a DSL modem to enable secure communication, access a network location to request secure communication, or other methods for initiating secure communication for a session. As such, upon a user selecting secure communication for a session, the DSL modem may employ an algorithm operable to be used by the DSL modem and the DSLAM. Upon the session terminating, a less-than-secure communication environment may be used.

FIG. 4 illustrates a flow diagram of a method for securely communicating information between a DSL modem and a DSLAM. The method begins at step 400. At step 401, a central office determines a DSLAM coupled to the control office for communicating information to a high speed network. For example, several DSLAMs may be coupled to the CO. Upon determining a specific DSLAM, the method proceeds to step 402 and determines a DSL subscriber for the DSLAM. For example, the DSLAM may include several DSL subscribers operably associated with the DSLAM. As such, the method proceeds to step 403 where the method determines if subscriber information for a DSL subscriber needs to be updated. If the subscriber is new, the method proceeds to step 411 where the central office database is updated and to step 412 to update a DSLAM database for the new subscriber. If at step 403, the subscriber information does not need updating, the method proceeds to step 404 where the method determines if hardware and/or software associated with the DSL subscriber has been changed. If the hardware and/or software has been changed, the method proceeds to step 411 where the CO database is updated and to step 412 where the associated DSLAM database is updated. For example, a new DSL modem may be installed for a current DSL subscriber. As such, each database may be updated to include the new information (i.e. model number, available algorithms, etc.) for the DSL subscriber.

The method then proceeds to step 405 where the DSL modem is initialized, trained, synchronized, etc. with the DSLAM for communicating information. The method then proceeds to step 406 where the method determines the session type for communicating information between the DSL modem and the DSLAM. For example, a user may want to securely communicate information on a per-use basis for a selective session. In a similar manner, a user may want to securely communicate information continuously or continuously with several different algorithms used within the same session for added security.

Upon determining a session type, the method proceeds to step 407 where an algorithm that may be used by the DSL modem and the DSLAM is identified. For example, the DSLAM may access a database that includes a list of algorithms available for a specific DSL modem. Upon identifying an algorithm for the DSL modem, the DSLAM may communicate an identifier to the DSL modem identifying the algorithm. The DSL modem and DSLAM may encrypt/decrypt information using the algorithm at step 409. For example, a user may want to encrypt/decrypt an email for added security. A user may select a security button associated with an email software application and the email may be securely communicated using an algorithm operable to be used by the DSL modem and the DSLAM. In this manner, secure communication may be provided on a per-use basis for communicating information.

Upon processing the information, the method proceeds to step 410 where the method determines if the session is a per-use session. If the session is not a per-use session, the method proceeds to step 406 where the type of session is determined. If the session is a per-use session or if the session has been terminated, the method proceeds to step 413 where the method ends.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for securely communicating via a network comprising:
    receiving an input from a network multiplexer operable to identify an algorithm associated with a communication module;
    processing information communicated between the communication module and the network multiplexer using the identified algorithm in order to provide secure communication between the communication module and the network multiplexer, the identified algorithm operable to decrypt information received from the network multiplexer, the identified algorithm operable to encrypt information transferred to the network multiplexer;
    providing a database associated with a central office;
    providing reference information associated with the network multiplexer in the database;
    updating the database associated with the central office;
    synchronizing the central office database with a database operably associated with the network multiplexer.

2. The method of claim 1, further comprising:
    determining subscribers and associated communication modules for the network multiplexer; and
    updating the database based on the determined subscribers and communication modules.

3. The method of claim 2, further comprising updating the database using information associated with a new communication module.

4. The method of claim 3, further comprising identifying an algorithm associated with the new communication module.

5. The method of claim 1, further comprising:
    communicating an instruction to the communication module operable to identify the algorithm.

6. The method of claim 1, further comprising:
    identifying communication modules associated with the network multiplexer; and
    updating the network multiplexer database with reference information from the identified communication modules.

7. The method of claim 1, further comprising:
    determining a communication session between the communication module and the network multiplexer; and
    processing information to provide the secure communication in response to determining the session.

8. The method of claim 1, further comprising:
    determining the algorithm operable to provide the secure communication;
    communicating the algorithm to the communication module; and
    storing the algorithm within a memory associated with the communication module.

9. A device operable to provide secure communication of information via a high speed network comprising:
    a DSL modem operable to communicate with a DSLAM; and
    a security module coupled to the DSL modem, the security module operable to provide secure communication of information between the DSL modem and the DSLAM, the security module operable to identify an algorithm associated with the DSL modem, wherein the algorithm is operable to decrypt information received from the DSLAM and encrypt information provided to the DSLAM, the security module operable to provide a database associated with a central office, the security module operable to provide reference information associated with the DSLAM in the database, the security module operable to update the database associated with the central office, the security module operable to synchronize the central office database with a database operably associated with the DSLAM.

10. The device of claim 9, further comprising the DSL modem operable to receive an instruction from the DSLAM identifying an algorithm for use by the security module.

11. The device of claim 9, wherein the DSLAM comprises a reference operable to identify an algorithm associated with the DSL modem.

12. The device of claim 9, wherein the DSLAM database is operable to identify DSL modems operably associated with the DSLAM.

13. The device of claim 12, wherein the DSLAM database comprises subscriber information associated with the DSL modems, the subscriber information including session information.

14. The device of claim 9, wherein the DSLAM is operably coupled to a central office, the central office database including DSLAM information and DSL subscriber information.

15. The device for claim 9, further comprising memory operably coupled to the security module, the memory operable to store an algorithm communicated to the DSL modem.

16. A device for providing secure communication of information via a network comprising:
    means for identifying an algorithm operable to provide secure communication between a network multiplexer and a communication module; and
    means for processing information communicated between the communication module and the network multiplexer using the algorithm, the algorithm operable to decrypt information received from the network multiplexer, the algorithm operable to encrypt information transferred to the network multiplexer;
    means for providing a database associated with a central office;
    means for providing the database with reference information associated with the network multiplexer;
    means for updating the database associated with the central office;
    means for synchronizing the central office database with a database operably associated with the network multiplexer.

17. The device of claim 16, further comprising:
    means for determining the algorithm using the network multiplexer; and means for communicating an instruction to the communication module to identify the algorithm.

18. The device of claim 17, further comprising:
means for receiving the instruction identifying the algorithm at the communication module; and
means for providing the secure communication based on the identified algorithm.

19. The device of claim 16, further comprising:
identifying communication modules associated with the network multiplexer; and
updating the network multiplexer database with reference information from the identified communication modules.

20. A computer readable medium including encoded logic for providing secure communication of information comprising the logic operable to:
identify an algorithm operable to provide a secure communication between a network multiplexer and a communication module; wherein the algorithm is operable to decrypt information received from the network multiplexer and encrypt information provided to the network multiplexer
process information communicated between the communication module and the multiplexer using the algorithm;
providing a database associated with a central office;
providing reference information associated with the network multiplexer in the database;
updating the database associated with the central office;
synchronizing the central office database with a database operably associated with the network multiplexer.

21. The computer readable medium of claim 20, further comprising the logic operable to:
receive an instruction identifying the algorithm; and
provide the secure communication based on the identified algorithm.

22. The computer readable medium of claim 20, further comprising the logic operable to:
determine a communication session between the communication module and the network multiplexer; and
process information to provide the secure communication in response to determining the communication session.

23. The computer readable medium of claim 20, further comprising the logic operable to:
receive the algorithm operable to provide the secure communication; and
store the algorithm within a memory associated with the communication module.

* * * * *